Jan. 22, 1974 S. R. BARNETTE 3,787,544
METHOD OF MAKING PLASTIC ARTICLES WITH A PARTIALLY
ENVELOPED CORE
Original Filed Jan. 14, 1963 3 Sheets-Sheet 1
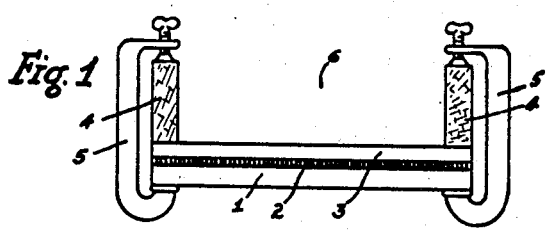
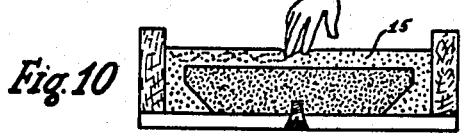
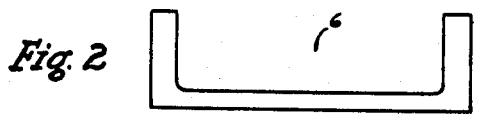
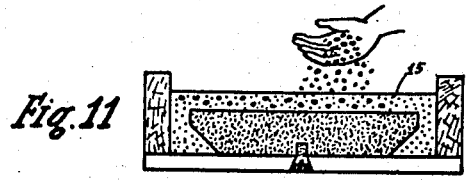
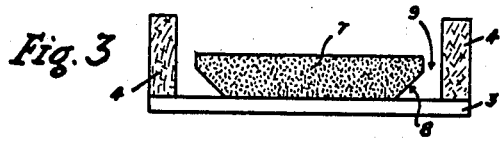
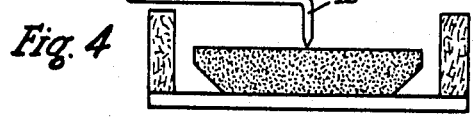
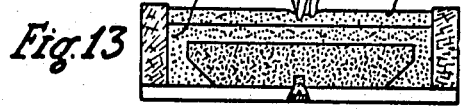
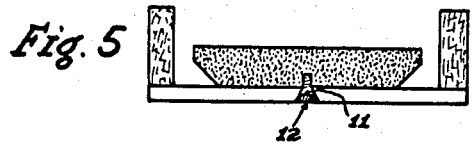
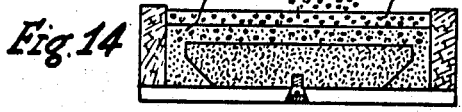
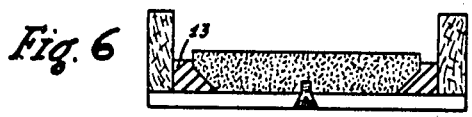
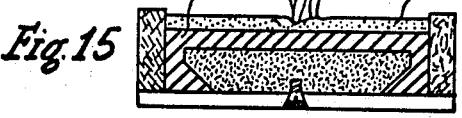
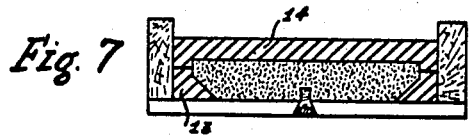
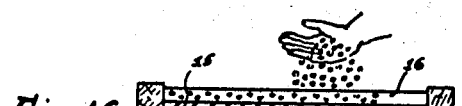
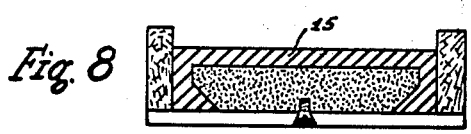

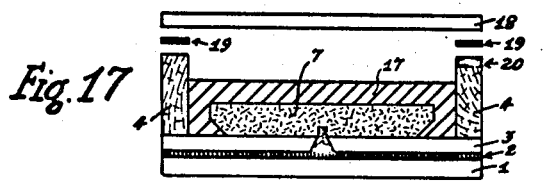
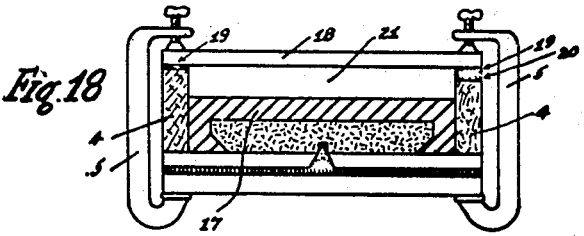
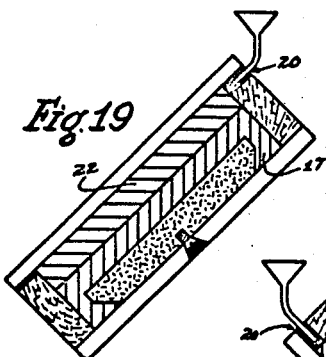
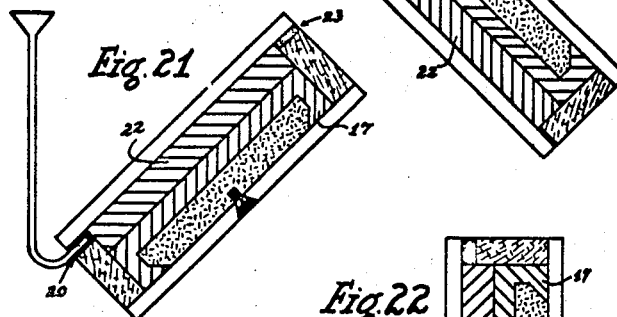
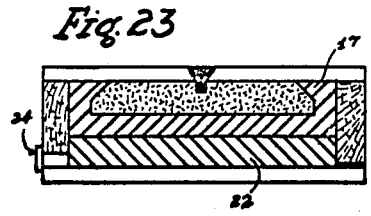
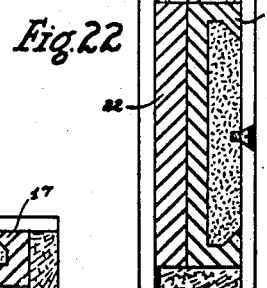
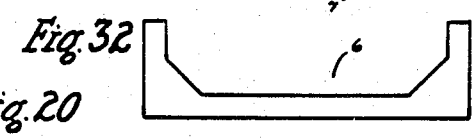
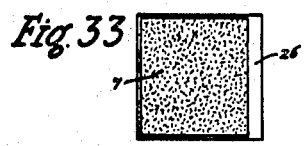
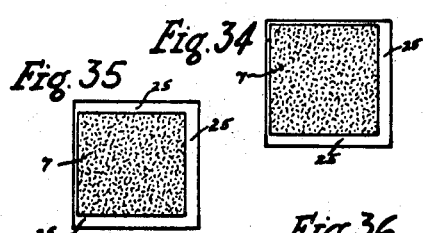
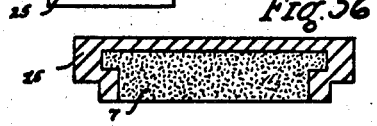
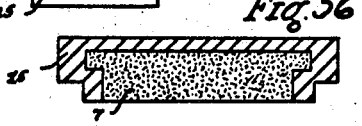

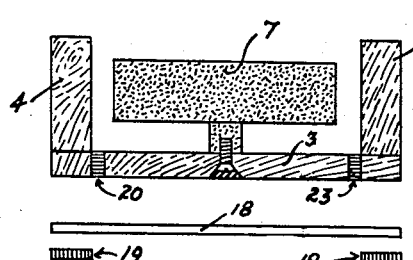
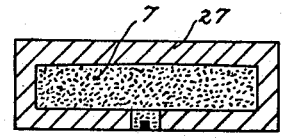
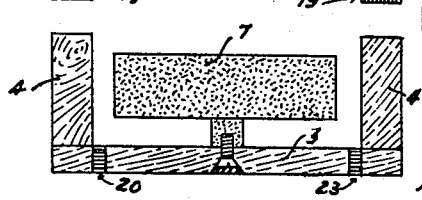
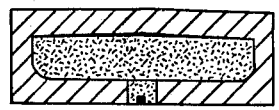
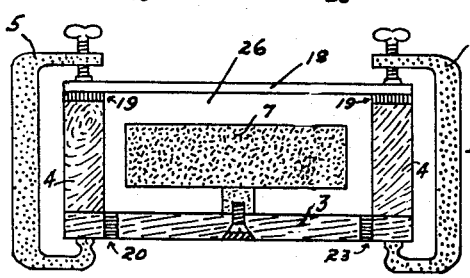
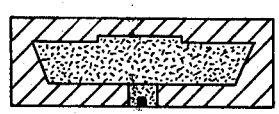
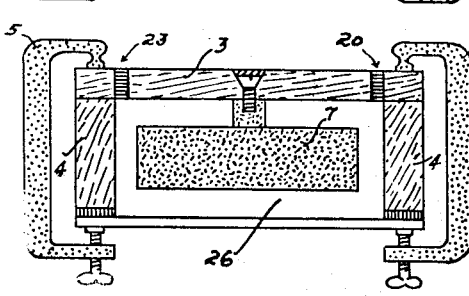
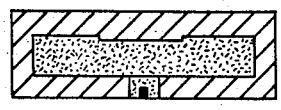
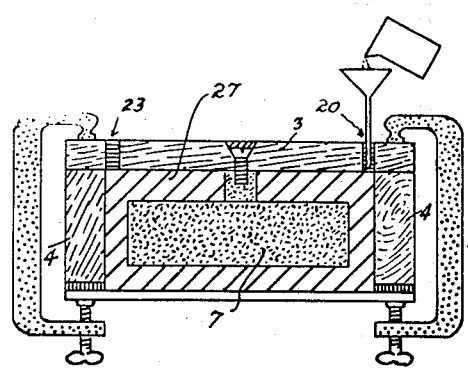
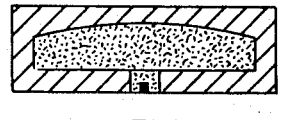
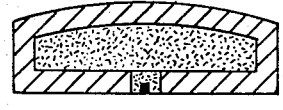
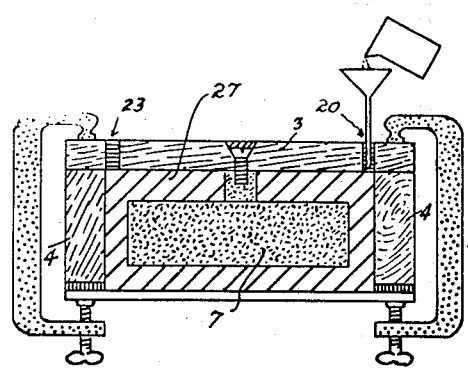
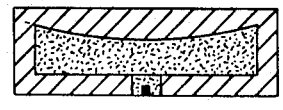
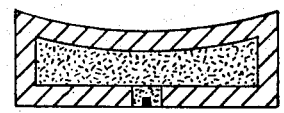
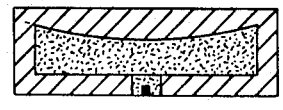
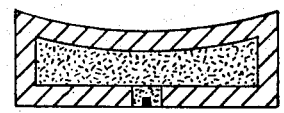
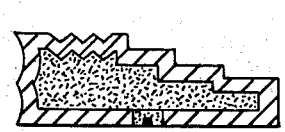

United States Patent Office 3,787,544
Patented Jan. 22, 1974

3,787,544
METHOD OF MAKING PLASTIC ARTICLES WITH A PARTIALLY ENVELOPED CORE
Stanley Ronald Barnette, 90 Cherokee St., Miami Springs, Fla.
Continuation of application Ser. No. 484,162, Aug. 23, 1965, which is a division of application Ser. No. 251,432, Jan. 14, 1963, and refiled as a continuation of application Ser. No. 646,435, June 15, 1967, now Patent No. 3,457,133, which in turn is a continuation-in-part of application Ser. No. 808,599, Apr. 24, 1959, now Patent No. 3,072,973. This application June 4, 1970, Ser. No. 41,771
The portion of the term of the patent subsequent to Jan. 15, 1980, has been disclaimed
Int. Cl. B29d 3/00
U.S. Cl. 264—69
12 Claims

ABSTRACT OF THE DISCLOSURE

A plastic article with a partially enveloped core is made by removably attaching the core to the base of a mold and embedding the core in curable material. A second layer of the material may be introduced after inverting the mold. Orientable material may be dispersed in the curable material.

---

This application is a streamlined continuation of my copending application Ser. No. 484,162, filed Aug. 23, 1965, which is a division of application Ser. No. 251,432, filed Jan. 14, 1963, and refiled as continuation application Ser. No. 646,435, filed June 15, 1967 and now U.S. Pat. 3,457,133, which in turn is a continuation-in-part of copending application Ser. No. 808,599, filed Apr. 24, 1959 and now U.S. Pat. No. 3,072,973, issued Jan. 15, 1963.

This invention relates to a process for producing plastic articles, namely, structural panels, table tops, flooring, roofing, furniture, window-sills, walls, etc., having a structural core partially enveloped in said plastic.

The invention relates to a method of forming articles of laminated plastic by a casting process which includes having the articles in any desired shape or form and with plain or decorative surfaces and/or plain or decorative embedments.

The invention contemplates the method of enveloping a core stock whereby to attain a product having bulk without excess weight and with full strength characteristics.

The invention also relates to a method of cast laminating pearlized, plain, or patterned decorative sheeting and enveloping a core stock material so as to achieve a structural surfacing material and particularly to such methods utilizing plastic.

Another object of the invention is to provide a method wherein the cast laminated material is provided with an extremely smooth or embossed effect, relatively hard surface.

Another object of this invention is to provide structural cores readily shaped so as to be interlocked into the plastic body of the article that surrounds said core. The interlocking principle of the plastic material in the recess of the core performs the act of a rib so as to reinforce the edge.

It is another object of this invention to produce articles having a plastic body self-bonded and interlocked to the core, having a unitary, integral and seamless plastic edge, with any desired exterior surface finish and having a deep three-dimensional decorative effect visible through the plastic. The core provides rigidity, lightweightedness, acoustical properties, shock-proof properties, insulation properties, etc.

Finally this invention relates to an article of manufacture in the form of a slab comprising a plastic body partially enveloping a core, produced by the methods herein disclosed.

In accordance with these and other objects which will become apparent hereinafter, the instant invention will now be described with reference to the accompanying drawings illustrating a preferred embodiment thereof.

In the drawings:

FIGS. 1 and 2 are cross-sectional views of molds that may be employed in the practice of this invention.

FIGS. 3 through 8 are cross-sectional views of the basic steps to partially envelope a core.

FIG. 9 is a cross-sectional view of an article produced according to this invention.

FIGS. 10 through 16 are cross-sectional views illustrating the steps of decorating the liquid resin and enveloping the core to produce an article with one even surface.

FIGS. 17 through 23 are cross-sectional views of the steps involved in order to produce an article with one finished surface.

FIGS. 24 through 30 are cross-sectional views of different cores readily shaped to be partially enveloped.

FIG. 31 is a cross-sectional view of an article having a plastic beveled edge produced in the mold illustrated in cross-sectional view in FIG. 32.

FIGS. 33, 34 and 35 are top views of different positions of a core into the mold in order to form square articles with one, two or three integral edges at the corresponding sides.

FIG. 36 is a cross-sectional view of an article having a special edge contour.

FIGS. 37 through 41 are cross-sectional views of the steps involved in order to produce an article with at least one finished surface. FIG. 42 is a cross-sectional view of the article produced by means of the steps depicted in FIGS. 37 through 41 which corresponds to FIG. 9 but in a similar position to FIG. 23. FIGS. 43 through 53 are cross-sectional views of some different shaped cores readily enveloped having different shapes and/or different surface finishes.

With reference to the drawings, the instant invention will now be described with reference to an example.

FIG. 1 depicts a mold assembly comprising a leveled platform 1, a metal foil blanket 2, a mold base 3 and mold walls 4. The mold walls and mold base are tightly secured by means of clamps 5 to form the open mold 6. The open mold 6 in some instances may be replaced by a one section cavity mold illustrated in FIG. 2, whenever standard sizes are manufactured.

The simple mold forms illustrated in 4 of FIG. 1 are of the melamine (Formica covered plywood) type as they can be very readily shaped to provide the desired side wall contours of the mold.

The mold base 3 indicated in FIG. 1 is a glass or melamine type, and a releasing compound for the mold base and mold walls must be used.

In the event that a polyester film is used to form a mold face and/or the mold walls, no coating is necessary as this material in itself acts as a ready release.

The one section cavity mold illustrated in FIG. 2 includes rubber, metal, glass or plastic material and in the case of rigid materials, the mold walls will form with the mold base an angle over 90° to permit the removal of the article from the mold.

Referring to FIG. 3 an example of an article produced by this method will be illustrated step by step through the succeeding illustrations, said article being a 48″ diameter table top.

A ¾″ thick structural core 7 as in FIG. 3 having a desired contour at the edge 8 consisting of a chamber and slightly narrower than the mold rim 4, is centered and laid on the mold base 3 into the open top mold 6 to form a predetermined cavity 9 limited by the edge of said core and the corresponding sections of the mold. As soon as the core is centered and positioned into the mold, means are provided to keep said core in close contact with the mold base and centered therein. Such means may consist of an upper bar 10 as indicated in FIG. 4 or one screw 11 illustrated in FIG. 5 secured to the bottom of the core through a machined hole 12 in the mold base 3, said means removable at any desired step of the operation and the choice of one or any other system being of no consequence.

In order to partially envelope the core two different procedures may be followed which are illustrated in FIGS. 6 through 9.

For the example of the 48" diameter table top a mixture is prepared consisting of: 4 quarts of polyester resin, ⅓ quart of styrene, 1 dram of cobalt naphthenate (6% cobalt) and 3 ounces of black polyester paste.

In the first procedure the partial envelopment is accomplished in two steps:

One half of the mixture is placed in a separate container and mixed with 1% of methyl ethyl ketone peroxide (60%), stirred and poured into the cavity or on top of the core, so that the catalyzed mixture 13 as depicted in FIG. 6 rises to a partial depth of the mold and permeates a portion of the edges of the core.

After this first layer hardens to a certain degree the remaining half of the mixture is mixed with 1% of methyl ethyl ketone peroxide (60%), stirred and poured on top of the first layer 13 and leveled to the edges, completely covering the edges and top surface of the core as indicated in 14 FIG. 7.

As soon as this last mixture is cured the article may be removed from the mold and will have the following characteristics: the plastic surface and edges are integral, the self-bonding between both layers is perfect, the plastic is self-bonded to the core and no seam will be evident at the edges because the proportion of pigment and other materials is the same for both layer. This article is illustrated in cross-sectional view in FIG. 9.

The second procedure to partially envelope the core is depicted in FIG. 8. This is accomplished in one step using the total amount of mixture to which one of methyl ethyl ketone peroxide (60%) is added, stirred and poured into the cavity or on top of the core and leveled to the edges, completely covering the top of the core and filling the cavity as indicated in 15.

After cured, and removed from the mold, the article will appear to be the same shown in FIG. 9 in cross-sectional view.

It should be noted that in order to avoid any bubble or entrapped air underneath the core or edge contour the pouring must be made from one side right over the cavity formed between the edge of the core and the mold walls so that the resin is permitted to flow freely into, through, and around the cavity following two different paths and displacing the air until said resin completely covers the cavity to the desired level.

The article produced by the described methods will have one even plastic surface with one color, black, in the example.

If a decorative effect is desired to be visible through the plastic surface, this may be accomplished by means of the following variations:

(a) Decorative effect formed in the liquid resin mixture that partially envelopes the core.

(b) Decorative effect formed in at least one additional layer of liquid resin mixture formed on top of the plastic that partially envelopes the core.

The decorative effect can be formed in the liquid resin that partially envelopes the core by means of any of the following examples:

The first example illustrated in FIG. 10 consists in adding to a predetermined amount of liquid catalyzed resin, one amount of pearl essence pigment, stirring, and pouring into the mold as described in FIG. 8. As soon as the resin mixture covers the top surface of the core, the liquid mixture is agitated in a combing motion to disperse and orient the pearl essence pigment, forming a pattern of choice, suspending this combing operation as soon as the increase in the resin viscosity indicates that the gel stage is reached permitting the pattern to remain fixed into the resin.

The second example illustrated in FIG. 11 consists of pouring liquid of catalyzed modified resin as indicated in FIG. 8, and, as soon as the top surface of the core is covered with resin introducing mother of pearl flakes into said liquid resin and forming a desired pattern of choice before the increase in the resin viscosity indicates that the gel stage is reached. Proper timing can be controlled by means of accelerator-and-catalyst-to-resin ratios and operating temperature.

The third example is illustrated in FIG. 12 wherein by means of a fine pointed instrument that has previously been slightly impregnated or tipped with black polyester paste, black veins are formed in the liquid catalyzed resin mixed with a pearl essence pigment to simulate a marble surface.

Whenever a deeper three-dimensional decoration is desired different variations may be used, by means of additional layers formed on top of the plastic that partially envelopes the core.

One of these variations consists in forming the first decorative layer in the liquid mixture that covers the top surface of the core as explained before and permitting this layer to cure, adding additional amounts of liquid resin and forming on each of these layers the desired effect or pattern, following the techniques of adding to the mixture or introducing into the mixture the decorative media as specified in the description of FIGS. 10 through 12. The only precaution is to permit each layer to harden to a certain degree before adding an additional layer of liquid resin. This is depicted in FIGS. 13 and 14, wherein the first decorative effect is formed in the mixture 15 that covers the top of the core and the secondary decorative effect is formed in the additional liquid layer 16.

Another variation consists in covering the top surface of the core with opaque pigmented liquid resin, to provide the background for the decorative effect and the masking medium for the core, forming the deep three-dimensional decorative effect in additional amounts of liquid resin poured in successive order on top of the opaque layer that covers the top surface of the core. This variation is illustrated in FIGS. 15 and 16, depicting one decorative layer 16 formed by means of dispersing the pearl essence pigment mixed in the resin or by means of introducing the mother of pearl flakes into the resin respectively. As stated before, the only necessary precaution is to permit each layer to harden to a certain degree before adding additional layers of liquid resin.

Following the described procedures the finished article when removed from the mold will have one even and flat surface, its flatness depending on the viscosity of the resin or the amount of monomer or thinner used.

Sometimes in order to obtain a smoother surface this may be achieved simply by adding a small amount of melted paraffin in styrene. This surface may also be sanded, polished or buffed.

In order to produce any desired and perfect finished surface of the article, the additional steps to be followed are illustrated in FIGS. 17 through 23.

This is accomplished by means of fitting on top of the existing mold assembly, after the clamps are removed, a top cover plate the underside of which conforms to the desired exterior surface finish of the article and a gasket to form a closed mold. This is depicted in FIG. 17 wherein the top cover plate 18, and the gaskets 19 are in position to be fitted on top of the existing mold assembly described in FIG. 1. In FIG. 18 the closed mold is already formed with the clamps 5 tightly securing the top cover plate 18 and the gaskets 19 against the mold walls 4, forming a cavity 21 limited by the top surface of the last cured plastic 17, the mold walls of the existing mold 4, the gaskets 19 and the underside of the top cover plate 18. The slot 20 has previously been machined in the mold walls 4 to provide means to introduce the liquid resin into said cavity and to permit the air to escape through said opening.

Then the entire mold assembly is tilted to an appropriate position so as to permit to introduce the liquid catalyzed resin 22 into the cavity 21 either from the top or from the bottom, as illustrated in FIGS. 19 through 22. In order to facilitate the entrapped air to escape from the cavity, the slot 20 must be properly shaped and located and also the mold assembly can be rotated.

After the cavity is filled and no air bubbles are present, the mold may be stored for cure in any desired position, one example illustrated in FIG. 22, but preferably in a horizontal position depicted in FIG. 23 so as to guarantee that the liquid resin remains on the face of the top cover plate, plugging the slot by means of plug 24. This position permits better results, because this last plastic layer formed in opposite direction to the preceding layers when cured will provide isotropic properties, equal opposite stresses and an extremely hard plastic surface.

In another variation explained in lines 33–40, Col. 3, in order to produce at least one desired and perfect finished surface of the article, using the total amount of mixture of catalyzed polyester resin in one step, the necessary procedure is illustrated in FIGS. 37 through 41. This is accomplished by means of positioning a structural core 7 on the mold base 3 with means provided to secure said core to the mold base 3, as illustrated in FIG. 37. For this example, a two section core is used conforming to the one illustrated in FIG. 30, but said core can be of any desired shape or form. After the core is in position, a top cover plate 18, the underside of which conforms to the desired exterior surface finish of the article, and gaskets 19 are fitted on top of the existing mold assembly to form a closed mold as indicated in FIG. 38.

FIG. 39 depicts the closed mold already formed with clamps 5 tightly securing the top cover plate 18 and the gaskets 19 against the mold walls 4, forming a cavity 26 limited by the core 7, the mold walls 4 of the existing mold, the gaskets 19 and the underside of the top cover plate 18. The intake or outtake slots 20 and 23 had previously been machined in the mold base 3 to provide means to introduce the liquid resin into said cavity and to permit the air to escape through one or both of said openings.

Then the entire mold assembly is turned as illustrated in FIG. 40 so as to permit to introduce the liquid catalyzed resin into the cavity 26.

FIG. 41 illustrates the liquid resin 27 being introduced into the cavity by means of slot 20. In order to facilitate the entrapped air to escape from the cavity, a slot 23 is provided.

After the cavity is filled and no air bubbles are present, the mold may be stored for cure and the article, when removed from the mold, will show at least one perfect finished surface as indicated in FIG. 42 wherein the core 7 is partially enveloped by plastic 27.

The article, when removed from the mold, will show one perfect finished surface, polished, satin, embossed, raised, sculptured, etched, irregular, etc.

The decorative effect will be visible through the plastic surface and the three-dimensional decorative effect will depend on the amount of layers used to produce said effect.

Also, the pigmented plastic portion that masks or covers the core may be totally or partially visible through the plastic surface or not, but very clearly at the edge and at a portion of the back of the article, the edge being self-formed and self-bonded and integral and unitary with the plastic surface, without seams.

The portion of the core which was in tight contact with the mold base, or the back side of the core, will always show where it is not covered by the plastic. The portion of plastic that partially covers the core will be governed by the width, thickness, and shape of the core as well as the predetermined contour of the mold base and wall.

In order to improve the appearance of the back of said article as well as to protect the core to exposure, it is possible to apply liquid pigmented catalyzed resin, paint or any other medium to cover this core portion.

FIGS. 24 through 29 illustrate some examples of one section cores that can be partially enveloped by means of the described methods. It should be noted that different contours in the back and edges of the core as well as in the contour of the mold base and mold walls will provide different shapes to the article.

In FIG. 30 a two section core is illustrated consisting of two slab cores joined together by means of nails, screws, gluing, etc., forming any desired shape; other similar kind of cores may be formed by means of three or more slabs following these principles.

FIG. 31 illustrates an article with a beveled edge produced with a mold depcited in FIG. 32.

FIGS. 33, 34 and 35 depict three top views of different variations in positioning the slab core stock into the mold to have a squared article with one, two, or three, self-formed edge sides, depending upon their end use which does not require four edges. In such instances, the cavity is only formed underneath the core in the selected sides 25, and the core requiring no machining in the other sides.

Finally, FIG. 36 illustrates an article produced in a mold having the mold walls shaped accordingly.

FIGS. 43 through 53 illustrate some different examples of partially enveloped cores using the methods heretofore described.

As an example, articles having a flat surface finish; polished, satin or patterned, are indicated in FIGS. 43, 46, 48, 49, and 51. An article having a pyramidical surface is illustrated in FIG. 44. An article having a raised surface is illustrated in FIG. 45 and an article having an engraved surface is illustrated in FIG. 47. This is only a basic resumé of the various effects which may be had.

Articles having a convex and concave surface are illustrated in FIGS. 50 and 52. FIG. 53 refers to an article having irregular surface and edges. In these figures also an article having a one piece core is illustrated in FIG. 45; all other examples comprising two section cores.

What is claimed is:

1. The casting method of producing a substantially rigid structural isotropic plastic-core-reinforced article which comprises:
   (a) positioning a substantially rigid core into a shallow open mold, the core having removable means to attach to a surface of the mold;
   (b) introducing at least one layer of curable material to partially fill the cavity around the core and cover the core;
   (c) permitting the curable material to set, thereby interlocking the core and the material;
   (d) positioning a mold cover over the remaining cavity, the underside of the mold cover conforming to the desired exterior surface finish of the article;
   (e) inverting the mold and filling the remaining cavity with the curable material;
   (f) permitting the curable material to cure; and
   (g) removing the article from the mold.

2. A method of producing an article having a cast plastic body which partially envelops a core comprising the steps of:
   (a) providing a mold having a base and wall;
   (b) providing a core having an undercut about its periphery edge;
   (c) positioning said core upon said base and spaced from said mold wall with the undercut edge facing said base;

(d) introducing into said mold in a quantity sufficient to cover the upper core face and periphery edge, at least one layer of core masking material, said material being polymerizable and gellable liquid mixture having at least one amount of at least one kind of orientable media added thereto;

(e) dispersing and orienting said orientable media by agitating said liquid mixture at least partially downward from the upper liquid surface to achieve a desired pattern;

(f) suspending said dispersing and orienting operation when the increase in viscosity of said liquid indicates that the gel stage is reached, permitting the pattern to remain fixed in the resin;

(g) permitting said core masking material to harden, and (h) removing the partially enveloped core from the mold.

3. The method of claim 2 which includes the polymerizable liquid being transparent.

4. The method of claim 2 which includes the orientable media being colored.

5. The method of claim 4 which includes the colored orientable media being pigment.

6. The method of claim 5 which includes the pigment media being introduced in the liquid by means of an instrument in forming a simulated marble effect.

7. The method of claim 5 whereby the polymerizable liquid mixture includes a filler.

8. The method of claim 2 which includes a film being used to form at least the surface of the article.

9. A method of claim 2 wherein the core masking material forms an integral shaped edge.

10. A method of claim 9 wherein the integral shaped edge is formed by the wall of the mold.

11. A method of claim 2 wherein the curable material contains a paraffin.

12. A method of claim 2 wherein the exterior face surface is further fabricated and finished.

References Cited
UNITED STATES PATENTS

| | | | |
|---|---|---|---|
| 2,632,922 | 3/1953 | Kish | 264—275 X |
| 2,682,111 | 6/1954 | Kish | 264—275 X |
| 3,046,610 | 7/1962 | Grunin | 264—108 UX |
| 3,072,973 | 1/1963 | Barnette | 264—271 X |
| 3,126,429 | 3/1964 | Saffir | 264—255 X |
| 3,328,499 | 6/1967 | Barnette | 264—108 |
| 2,856,635 | 10/1958 | Gerson et al. | 264—73 |

ROBERT F. WHITE, Primary Examiner

J. R. THURLOW, Assistant Examiner

U.S. Cl. X.R.

264—73, 108, 255, 274, 278